United States Patent
Graefling et al.

(10) Patent No.: US 9,929,685 B2
(45) Date of Patent: Mar. 27, 2018

(54) SAFETY CIRCUIT AND BRUSH HOLDER FOR PREVENTING FAULT CONDITIONS IN AN ALTERNATOR

(71) Applicant: Infineon Technologies AG, Neubiberg (DE)

(72) Inventors: Martin Graefling, Graz (AT); Christoph Seidl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 50 days.

(21) Appl. No.: 14/735,831

(22) Filed: Jun. 10, 2015

(65) Prior Publication Data

US 2016/0365813 A1  Dec. 15, 2016

(51) Int. Cl.
  *H02P 9/00* (2006.01)
  *H02P 29/024* (2016.01)
  *H02P 9/48* (2006.01)

(52) U.S. Cl.
  CPC ............ *H02P 9/006* (2013.01); *H02P 9/48* (2013.01); *H02P 29/024* (2013.01)

(58) Field of Classification Search
  CPC ........... H02P 9/006; H02P 9/48; H02P 29/024
  USPC ......................................................... 322/69
  See application file for complete search history.

(56) References Cited

U.S. PATENT DOCUMENTS

| | | | | |
|---|---|---|---|---|
| 3,571,630 A | * | 3/1971 | Widlar | G05F 3/185 257/E27.031 |
| 4,419,588 A | * | 12/1983 | Goiset | B64D 47/00 307/18 |
| 6,163,138 A | * | 12/2000 | Kohl | H02J 7/245 322/25 |
| 2003/0201756 A1 | * | 10/2003 | Hocken | H02P 9/14 322/24 |
| 2004/0263131 A1 | * | 12/2004 | Suelzle | H02P 9/10 322/28 |
| 2006/0061335 A1 | * | 3/2006 | Inokuchi | H02P 9/006 322/37 |
| 2006/0082347 A1 | * | 4/2006 | Asada | H02P 9/305 322/59 |

(Continued)

FOREIGN PATENT DOCUMENTS

| | | |
|---|---|---|
| CN | 201976060 U | 9/2011 |
| CN | 102545755 A | 7/2012 |

*Primary Examiner* — Viet Nguyen
(74) *Attorney, Agent, or Firm* — Murphy, Bilak & Homiller, PLLC

(57) ABSTRACT

A fault protection circuit for an alternator is provided for preventing faults such as a prolonged full-field condition in the alternator. The fault protection circuit includes a safety switch that is opened when the alternator output voltage becomes too high, as may occur during a full-field condition caused by an electrical short, or when some other fault is detected within the alternator. The opening of this safety switch disconnects a supply voltage feeding an excitation current control switch. The excitation current control switch normally adjusts an excitation current provided to a rotor in the alternator, in order to regulate a voltage output from the alternator. By providing a safety switch that disconnects the supply voltage for the rotor excitation in the alternator, the alternator output voltage may be prevented from reaching excessive levels that may damage devices in an electrical system and a battery coupled to the alternator.

20 Claims, 6 Drawing Sheets

(56) References Cited

U.S. PATENT DOCUMENTS

| | | | | |
|---|---|---|---|---|
| 2006/0108987 A1* | 5/2006 | Aoyama | ............... | H02J 7/0047 322/28 |
| 2006/0192534 A1* | 8/2006 | Yamauchi | ............... | H02P 6/005 322/25 |
| 2008/0007229 A1* | 1/2008 | Jabaji | ....................... | H02H 7/06 322/69 |
| 2008/0179890 A1* | 7/2008 | Asada | ....................... | H02P 9/30 290/40 B |
| 2010/0079117 A1* | 4/2010 | Bekiarov | ............. | H02J 7/1438 322/28 |
| 2011/0057630 A1* | 3/2011 | Saito | ....................... | H02M 7/02 322/28 |
| 2013/0119948 A1* | 5/2013 | Bekiarov | ................. | H02P 9/48 322/24 |

\* cited by examiner

SAFETY CIRCUIT AND BRUSH HOLDER FOR PREVENTING FAULT CONDITIONS IN AN ALTERNATOR

TECHNICAL FIELD

The present application relates to a safety circuit, a brush holder, and a method for preventing or mitigating fault conditions in an alternator.

BACKGROUND

Automotive electrical systems are required to supply electrical power to a variety of devices within a vehicle. These devices typically include an electric starter motor, the engine ignition system, an electronic control unit (computer), headlights, and a variety of accessories. Electrical power is supplied to these devices (loads) by a battery, wherein the most common type is a 12V lead-acid battery. The battery is typically the primary or only source of electrical power when the vehicle's engine is not running, whereas the battery and an alternator typically both supply electrical power when the engine is running.

The alternator converts mechanical power generated by the engine into electrical power that is used both for meeting the demands of the various electrical devices and for charging the battery. In order to maintain an adequate charge state in the battery and to avoid damaging the battery (e.g., overcharging) or the various electrical devices, the alternator must generate an output voltage in a fairly narrow range. To support a typical 12V battery and an associated electrical system, the alternator should supply an output in the range of 14.0 to 14.6 V, with an ideal voltage of about 14.2V. The voltage output from the alternator is controlled using some type of voltage regulation.

The output voltage for most modern alternators is regulated by controlling the amount of current flowing through the windings in the rotor of the alternator. This current, in conjunction with the rotation speed of the rotor, determines the induced current flowing through the windings of the stator which, after rectification, produces the alternator's output voltage. Voltage regulation is accomplished by sensing the output voltage from the alternator, and using the sensed voltage to determine an appropriate excitation current to provide to the rotor.

Control of the excitation current provided to the rotor is accomplished via appropriately switching a supply voltage (e.g., the battery voltage) that provides current to the rotor. This switching is typically performed by a power transistor, which is controlled by an excitation control signal. The excitation control signal may be generated by a controller within the alternator, in conjunction with voltage regulation performed by the controller and/or by an electronic control unit (ECU) located outside of the alternator.

A potential safety issue arises if a fault causes a "full field" condition in the alternator. This occurs when the supply voltage becomes connected directly to the rotor such that the rotor's excitation current is no longer limited by the controller within the alternator and the associated voltage regulation. Such a fault leads to an uncontrolled alternator voltage output, which is likely to reach excessive levels that may damage the battery (by overcharging it) or other devices connected to the electrical system.

One solution to the above problem is to, upon detection of a "full-field" condition, disconnect the alternator output from the battery and the other components of the electrical system. However, the alternator outputs relatively high current, e.g., in the range of 50-200 amperes, which makes the switching of this output unfeasible and/or prohibitively expensive.

Another proposed solution implements a safety function that is implemented by interrupting the control signal, e.g., from the controller of the alternator to the switch controlling the rotor excitation current. Such a solution addresses faults in the controller itself, faults caused by inputs to the controller (e.g., an incorrect sense voltage), or a fault in the signal controlling the excitation current control switch.

However, the above remedy fails to address the situation in which the full-field condition is caused by a short occurring around the excitation control switch, i.e., the situation wherein the supply voltage is electrically shorted directly to the rotor input. A fault protection circuit and method for addressing a full-field condition caused by such a fault is desirable.

SUMMARY

According to an embodiment of a fault protection circuit, the fault protection circuit comprises an excitation current switch and a safety switch. The excitation current switch controls the amount of current provided to a rotor of an alternator. The amount of current determines the voltage output from the alternator and, thus, can be used to regulate the output voltage. The safety switch is interposed between the excitation current switch and its supply voltage, so that the safety switch can disconnect the supply voltage from the excitation current switch when a fault condition is detected, e.g., during a full-field condition of the alternator.

According to an embodiment of a brush holder for use in an alternator, the brush holder comprises: a housing that retains a brush, an excitation current switch and a safety switch. The brush is configured to conduct an excitation current to a rotor within the alternator. The excitation current switch provides an excitation current to the rotor via the brush as a function of an excitation current control signal that controls the excitation current switch, so as to regulate an output voltage of the alternator. The safety switch is electrically connected in series between the excitation current switch and its supply voltage, such that the safety switch can disconnect the supply voltage from the excitation current switch, responsive to receiving an indication that a fault condition exists.

According to a method in an alternator for mitigating a fault condition of the alternator, the method comprises: providing an excitation current to a rotor of the alternator using an excitation current switch; and, responsive to detecting a fault condition in the alternator, disconnecting the supply voltage from the excitation current switch by opening a safety switch electrically connected in series between the excitation current switch and its supply voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide for avoiding or mitigating fault conditions such as an uncontrolled full-field condition in an alternator and an associated overvoltage situation at the alternator's output. This is accomplished without adding a large and expensive switch on the output of the alternator. In order to address a variety of fault conditions that may lead to a full-field condition, including a short between the supply voltage (e.g., the battery voltage) and the input that feeds the alternator rotor, a safety switch is added that is configured to disconnect the supply voltage from an excitation control switch, where the excitation control switch supplies an excitation current to the rotor of the alternator.

Figure 1:
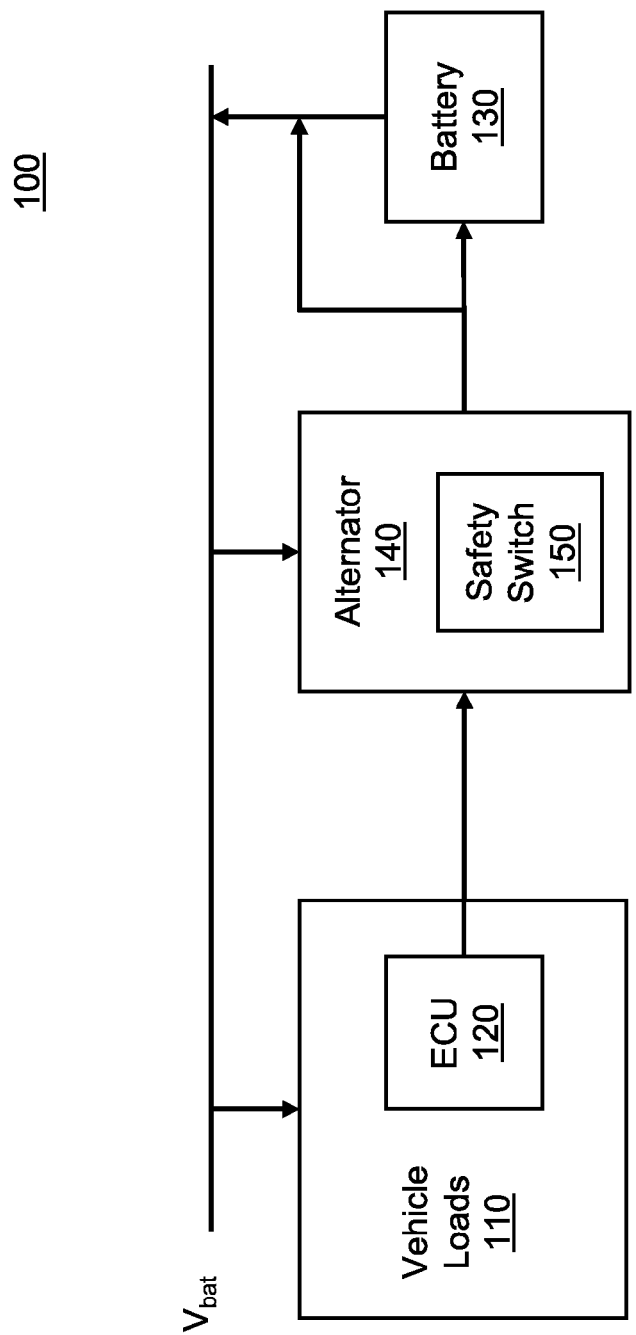
FIG. 1 illustrates a high-level block diagram of a vehicle electrical system including a safety switch disposed within an alternator.

FIG. 1 provides a high-level block diagram of a typical automotive electrical system 100. The system 100 comprises a variety of vehicle loads 110, a battery 130, and an alternator 140. The vehicle loads 110 include an Electronic Control Unit (ECU) 120. The alternator 140 includes a safety switch 150, which is configured to disconnect an excitation current that feeds a rotor of the alternator to prevent fault conditions, such as an overvoltage situation, at the output of the alternator 140.

Figure 2:
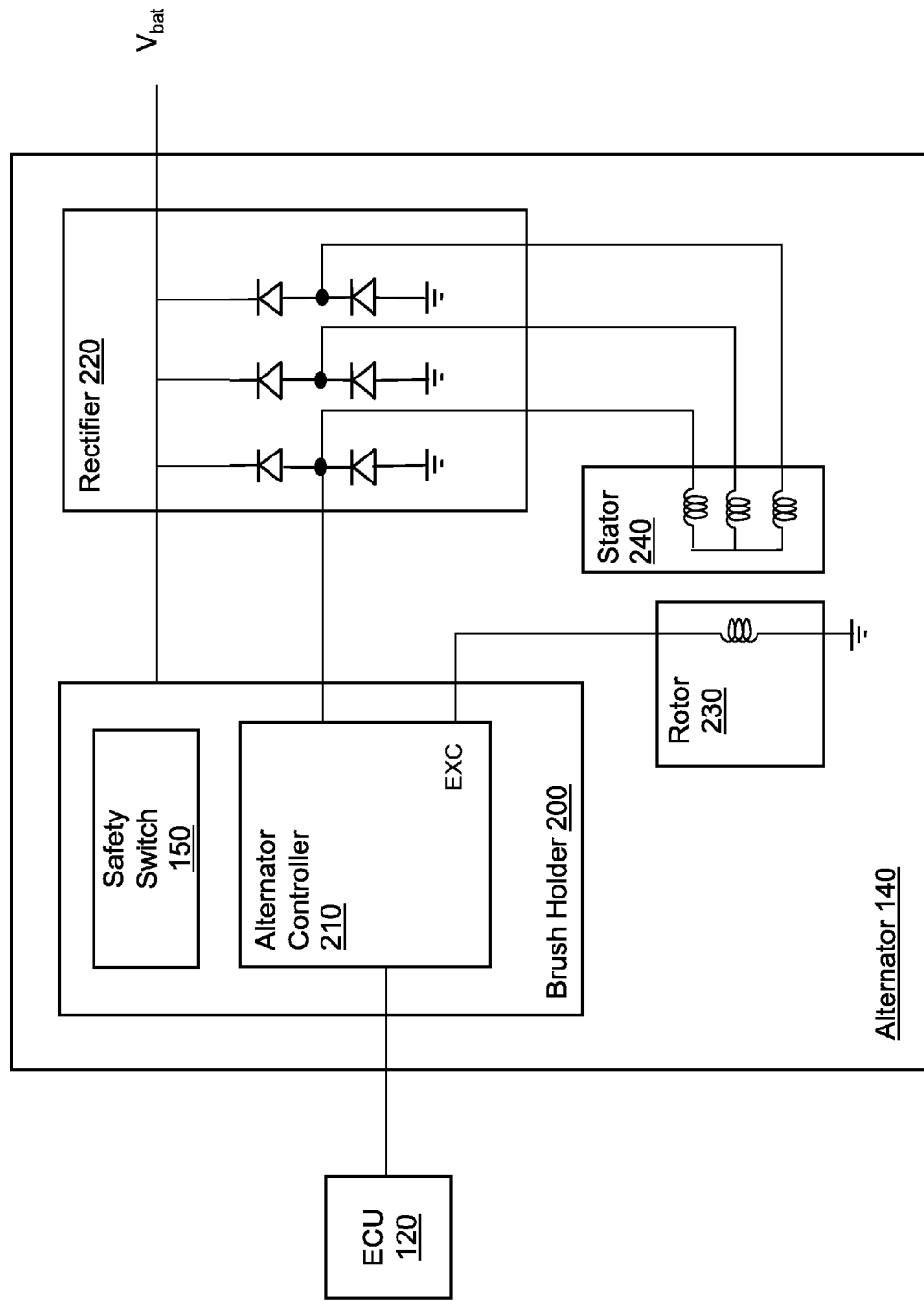
FIG. 2 illustrates a block diagram of an alternator that includes a safety switch.

FIG. 2 illustrates a block diagram of the alternator 140. An alternator controller 210 provides an excitation current to the rotor 230 of the alternator 140. The rotor 230 is rotated by mechanical means, e.g., a drive belt coupled to a running engine. The rotating rotor 230 creates a magnetic field that induces electrical current in the windings of the stator 240 of the alternator 140. A typical stator has three windings, as shown in FIG. 2, such that three alternating current (AC) outputs are generated. A rectifier 220, typically constructed using diodes, converts the phased AC current from the windings of the stator 240 into a direct current (DC) output. The DC output should be appropriate both for charging the battery 130 and supplying power to the various vehicle loads 110.

Voltage regulation is required to maintain the output voltage (e.g., $V_{bat}$) of the alternator 140 at a proper level. The alternator output voltage is determined by the rotation speed of the rotor 230 and the excitation current (EXC) provided to the rotor 230 by the alternator controller 210. In a first configuration, the alternator controller 210 performs voltage regulation by sensing the alternator output voltage (which is also the battery voltage $V_{bat}$ in FIG. 2), and setting the excitation current in order to maintain a desired set voltage ($V_{set}$). The set voltage $V_{set}$ may be provided to the alternator controller 210 by an ECU 120 in this first configuration. In a second configuration, the ECU 120 is primarily responsible for voltage regulation. In the second configuration, the ECU 120 senses the voltage $V_{bat}$ and sends a message to the alternator controller 210 commanding the alternator controller 210 to set a specific excitation current (EXC) for the rotor 230.

The alternator 140 also includes a safety switch 150, which may be used to disconnect the source voltage, e.g., $V_{bat}$, from the circuitry driving the excitation current to the rotor 230. The safety switch 150 will be described in more detail below as part of a fault (e.g., overvoltage) protection circuit.

FIG. 2 shows the alternator controller 210 and the safety switch 150 disposed on a brush holder 200. While this is a convenient and preferred place for including these elements, it is understood that the alternator controller 210 and the safety switch 150 could be physically located elsewhere, including other locations within the alternator 140 or even outside of the alternator 140.

Fault Protection Circuit Embodiment with Supervision Circuit in ECU

Figure 3:
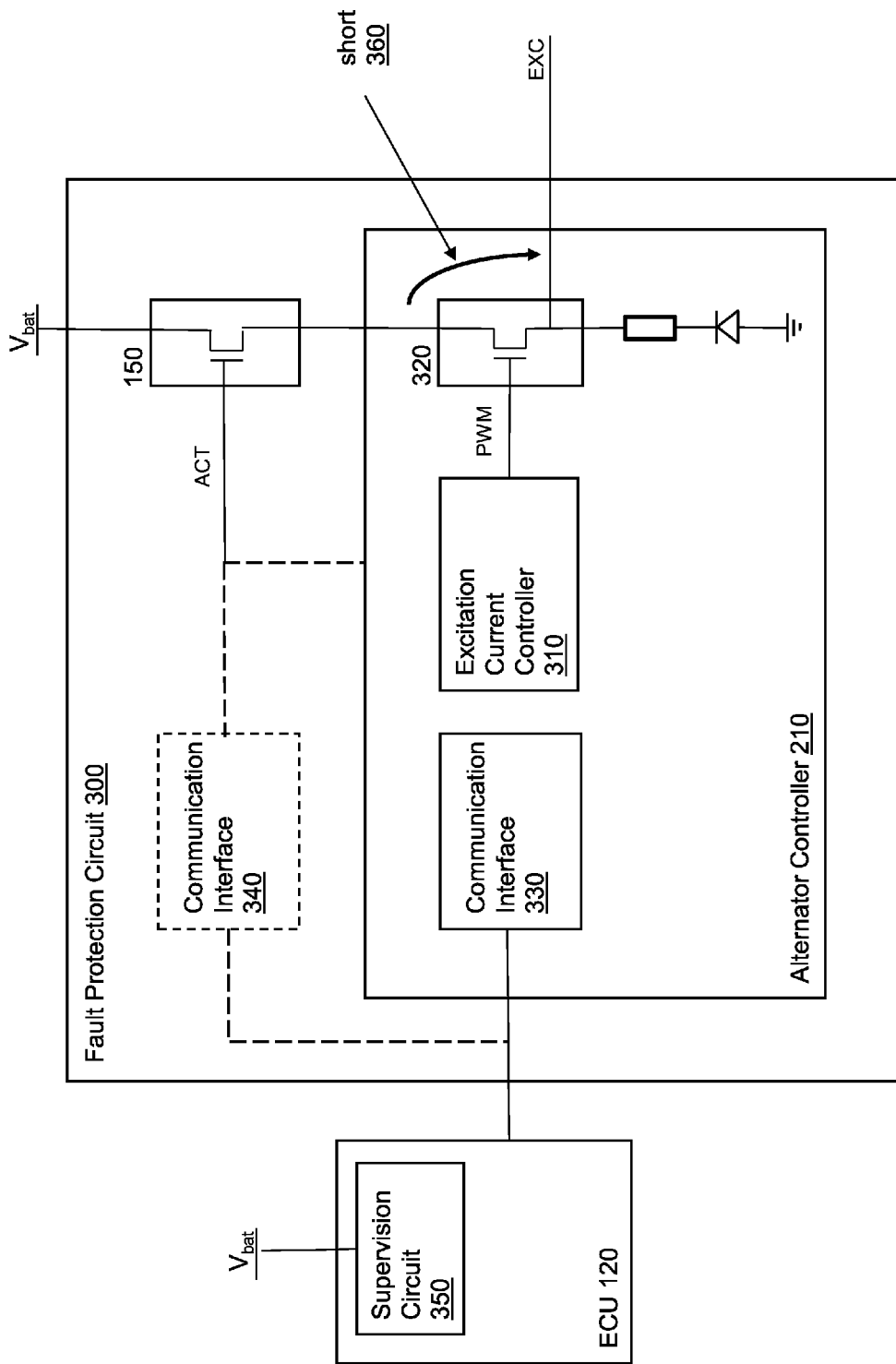
FIG. 3 illustrates a block diagram of an embodiment of a fault protection circuit, including a safety switch, which could be incorporated into an alternator.

FIG. 3 illustrates an embodiment of a fault protection circuit 300 that includes the safety switch 150 for interrupting the excitation current that drives the rotor 230. In more detail, an excitation current controller 310 provides an excitation current signal to an excitation current switch 320. This signal may be, for example, a pulse width modulated (PWM) waveform as shown in FIG. 3, wherein the duty cycle is configured to provide the desired excitation current. As explained previously, the excitation current (EXC) output from the alternator controller 210 is adjusted to maintain a desired set voltage, $V_{set}$, at the alternator output. The voltage regulation may be performed in the ECU 120, the alternator controller 210, or elsewhere in the fault protection circuit 300. In other words, any of these devices may determine the appropriate excitation current to maintain the desired set voltage, $V_{set}$, at the output of alternator 140.

The excitation current switch 320 may be implemented using many different technologies, but is typically implemented using a power metal-oxide semiconductor field-effect transistor (MOSFET). In one embodiment, the excitation current switch 320 is a double-diffused MOSFET (DMOS). In another embodiment, the excitation current switch 320 is a laterally diffused MOSFET (LDMOS). If the excitation current switch 320 is any type of N-channel MOSFET, the drain terminal of the switch 320 is connected to a voltage supply, the source terminal provides the excitation current (EXC) and is electrically connected to the rotor 230, and the gate terminal is connected to the excitation current controller 310. As an alternative to a power MOSFET, the excitation current switch 320 could instead be an insulated-gate bipolar transistor (IGBT) or a high-electron-mobility transistor (HEMT), also known as a heterostructure FET (HFET) or a modulation-doped FET (MODFET). Still other switch types are possible, provided they are capable of providing an adequate excitation current (EXC) for the rotor 230. The rotor 230 typically requires a maximum excitation current in the range of 5-10 amperes in order to meet the output power requirements of the alternator 140.

The alternator controller 210 further includes a communication interface 330, configured primarily for communicating with the ECU 120. Communication between the ECU 120 and the communication interface 330 may take place over a serial bus, such as a Local Interconnect Network (LIN) or a Controller Area Network (CAN) bus. The ECU 120 may provide, among other things, commands informing the alternator controller 210 what desired set voltage $V_{set}$ to use for voltage regulation, or what level of excitation current (EXC) to provide to the rotor 230.

The fault protection circuit 300 also includes the safety switch 150 interposed between the excitation current switch 320 and a supply voltage (e.g., Vbat). When the safety switch 150 receives a signal (ACT) indicating a fault such as an overvoltage condition, the safety switch 150 opens thereby disconnecting the supply voltage from the excitation current switch 320. For faults occurring downstream from the safety switch 150 (e.g., a short 360 between the input and output of the excitation current switch 320, a short on the control input to the excitation current switch 320, or a fault in the signal output from the excitation current controller 310), disconnecting the supply voltage in this manner serves to mediate the fault. Stated alternatively, the safety switch 150 prevents any prolonged "full-field" condition in the alternator 140, as caused by a continuous excitation current being provided to the rotor 230. The safety switch 150 thus prevents excessive voltage in the electrical system 100 from damaging the electrical devices (such as the devices associated with the vehicle loads 110) or the battery 130.

Note that the short 360, as shown in FIG. 3, may be a high-impedance short that does not lead to a significant overvoltage situation, as described previously. For example, a highly resistive short of 100 kohms or more might not produce an alternator output voltage that is detected as being excessive. However, such a fault has the potential detrimental consequence that the short 360 could discharge the battery 130 while the vehicle engine rotating the alternator 140 is not running. A fault such as this could also be mitigated using the fault protection circuit 300 described previously.

As with the excitation current switch 320, the safety switch 150 may be implemented using many different technologies. The safety switch 150 is preferably implemented using a power metal-oxide semiconductor field-effect transistor (MOSFET), such as a double-diffused MOSFET (DMOS) or laterally diffused MOSFET (LDMOS). If the safety switch 150 is any type of N-channel MOSFET, the drain terminal of the switch 150 is connected to a voltage supply (e.g., $V_{bat}$), the source terminal is connected to an input of the excitation current switch 320, and the gate terminal is connected a control signal (ACT) used for opening the safety switch 150 when a fault condition is detected. Conversely, if the safety switch 150 is a P-channel MOSFET, its source terminal will be connected to the voltage supply and its drain will be connected to the input of the excitation current switch 320. As an alternative to a power MOSFET, the safety switch 150 could instead be an insulated-gate bipolar transistor (IGBT) or a high-electron-mobility transistor (HEMT), also known as heterostructure FET (HFET) or modulation-doped FET (MODFET). Still other switch types are possible, provided they are capable of providing an adequate excitation current.

The current requirement for the safety switch 150 is similar to that of the excitation current switch 320, since the excitation current for the rotor 230 flows through both of the switches. (As explained previously, the rotor 230 typically requires a maximum current in the range of 5-10 amperes).

In the embodiment illustrated in FIG. 3, the fault condition is detected by a supervision circuit 350, which is located outside of the alternator controller 210. Specifically, the supervision circuit 350 is located in the ECU 120. This configuration is preferred for an arrangement in which the ECU 120 provides the voltage regulation. For such an arrangement, the ECU 120 is already monitoring the alternator output voltage (e.g., $V_{bat}$), to maintain an alternator output voltage near the desired set voltage $V_{set}$. If the alternator output voltage exceeds some threshold $V_{thresh}$ deemed excessive (e.g., 15V), the supervision circuit 350 determines that a fault has occurred which can lead to an overvoltage condition. The ECU 120 then signals the protection circuit 300 that the safety switch 150 needs to disconnect the power supply from the excitation current switch 320.

Two alternative sub-embodiments for controlling the safety switch 150 are illustrated in FIG. 3 using dashed lines. In a first sub-embodiment, the ECU 120 signals the communication interface 330 that the safety switch 150 should disconnect the supply voltage from the excitation current switch 320. The alternator controller 210 then directs the safety switch 150 to open, thereby disconnecting the supply voltage (e.g., $V_{bat}$) from the excitation current switch 320.

In a second sub-embodiment, a communication interface 340 is provided in the fault protection circuit 300, wherein the communication interface 340 is not within the alternator controller 210. For example, the communication interface 340 may be dedicated to controlling the safety switch 150. The communication circuit 340 may be disposed on the same semiconductor die (chip) as the safety switch 150. In the second sub-embodiment, the ECU 120 may signal the communication interface 340 that the safety switch 150 needs to open using a serial bus, such as that described previously regarding the communication interface 330, or using a dedicated signal line that is separate from any serial bus used by the ECU 120 or the communication interface 330.

For either of the sub-embodiments described above, in order to prevent the safety switch 150 from being affected by the same fault as that causing short 360 across the excitation current switch 320, it may be desirable to physically separate the safety switch 150 from the alternator controller 210. For example, the safety switch 150 should be disposed on a different die than the alternator controller 210.

Figure 4:
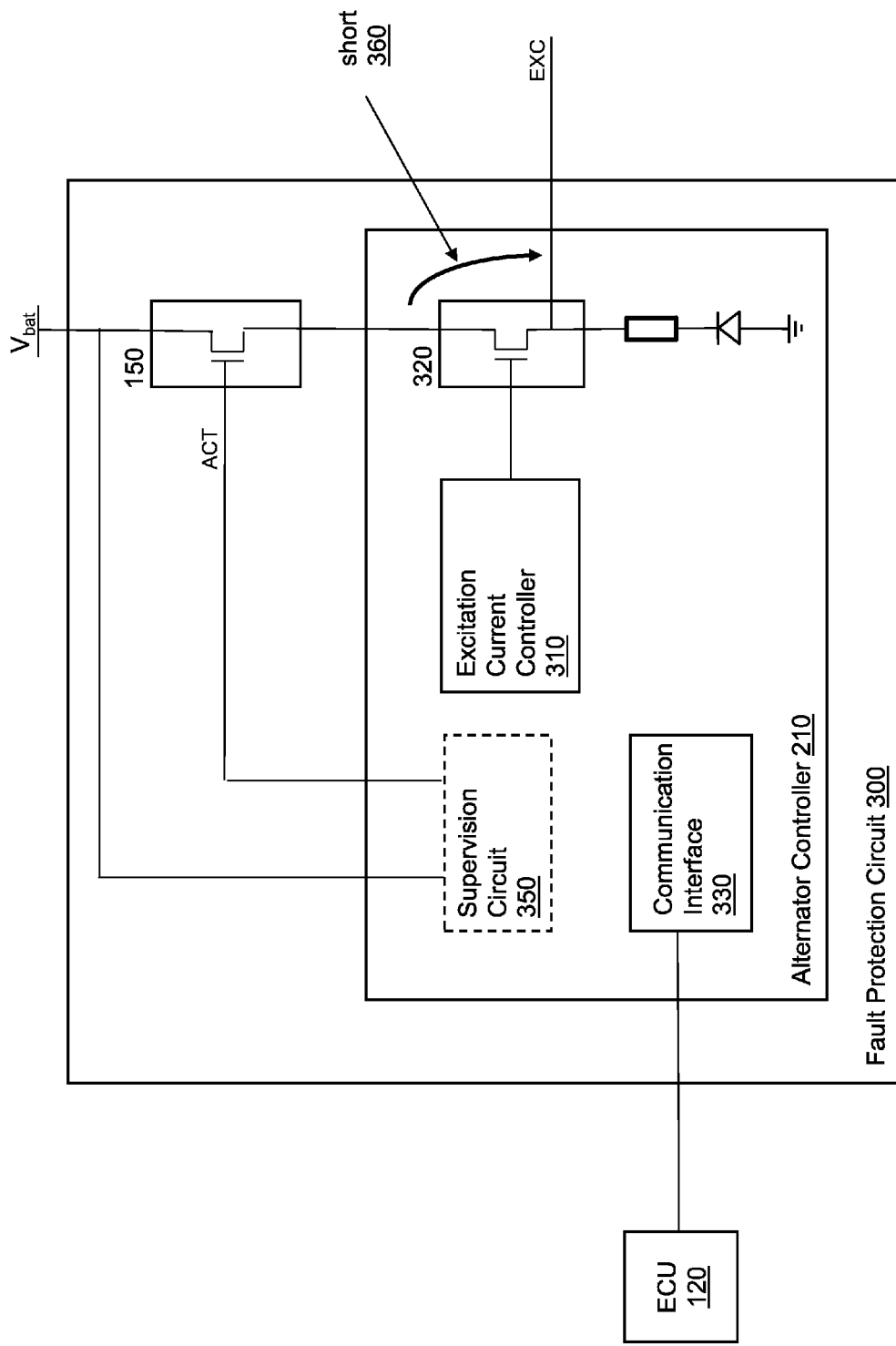
FIG. 4 illustrates a block diagram of an alternate embodiment of a fault protection circuit, including a safety switch, wherein this embodiment includes a supervision circuit.

Fault Protection Circuit Embodiment with
Supervision Circuit in Alternator Controller FIG. 4 illustrates an alternative embodiment of a fault protection circuit 300. In this alternative embodiment, the supervision circuit 350 is part of the fault protection circuit 300, rather than being located in the ECU 120. Such a configuration may be preferred for arrangements in which alternator voltage regulation is performed by the alternator controller 210. For such arrangements, the alternator controller 210 is monitoring the alternator output voltage (e.g., $V_{bat}$) already. As previously described herein, if the supervision circuit 350 detects that the alternator output voltage exceeds some threshold deemed excessive (e.g., 15V), the supervision circuit 350 determines that a fault has occurred which can lead to an overvoltage condition. The supervision circuit 350 then commands the safety switch 150 to disconnect the supply voltage from the excitation current switch 320.

As shown in FIG. 4, the supervision circuit 350 is located within the alternator controller 210, and could even be disposed on the same semiconductor die as the alternator controller 210. A sub-embodiment with this configuration has the advantage that circuit components used for the voltage regulation could be reused, e.g., the analog components associated with sensing the alternator output voltage (e.g., $V_{bat}$) may also be used to detect when the alternator output voltage is above a predetermined threshold. However, as indicated by the dotted box, the supervision circuit 350 could be disposed elsewhere.

In a second sub-embodiment (not shown), the supervision circuit is located outside of the alternator controller 210. For example, the supervision circuit 350 and the safety switch 150 may be grouped together as a safety circuit. These two components may even be disposed on the same semiconductor die, wherein this die is different from that of the alternator controller 210. This second sub-embodiment has the advantage that a safety circuit including the supervision circuit 350 and the safety switch 150 could be included in the fault protection circuit 300, without any design changes to an existing alternator controller 210.

For either of the above-described sub-embodiments, locating the supervision circuit 350 in the fault protection circuit 300 has the advantage that such an implementation requires no changes to an existing ECU 120. The changes required to implement the safety features of the fault protection circuit 300 could be implemented entirely within the alternator 140, meaning that a new alternator design could be included in the electrical system 100 without redesigning the ECU 120 or other components of the electrical system 100. Similarly, a replacement alternator having these safety features could be installed in an existing electrical system 100.

Figure 5:
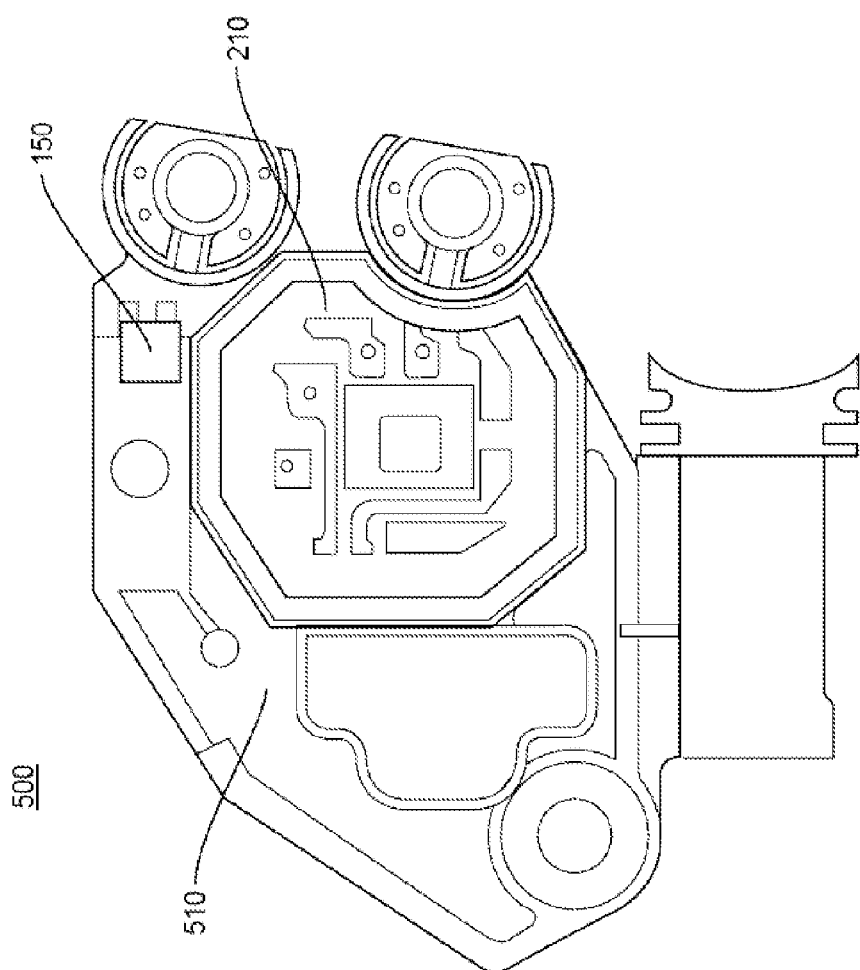
FIG. 5 illustrates a brush holder that incorporates a safety switch.

FIG. 5 illustrates a brush holder 500 comprising a housing 510, the safety switch 150, and the alternator controller 210. The brush holder 500 is configured to retain a brush that conducts an excitation current to the rotor 230 of the alternator 140, as shown in FIG. 2. The housing 510 is composed of a suitable material such as plastic, ceramic, or a graphite-based material. The safety switch 150 and the alternator controller 210 may be disposed in an open recess in the housing, embedded within the housing, or attached to an external or internal surface of the housing, e.g., using an adhesive, encapsulation. The safety switch 150 is configured to disconnect a supply voltage from an excitation current switch located within the alternator controller 210 as previously described herein. The brush holder 500 is configured to comprise the first or second embodiments of the fault protection circuit 300 described previously.

Figure 6:
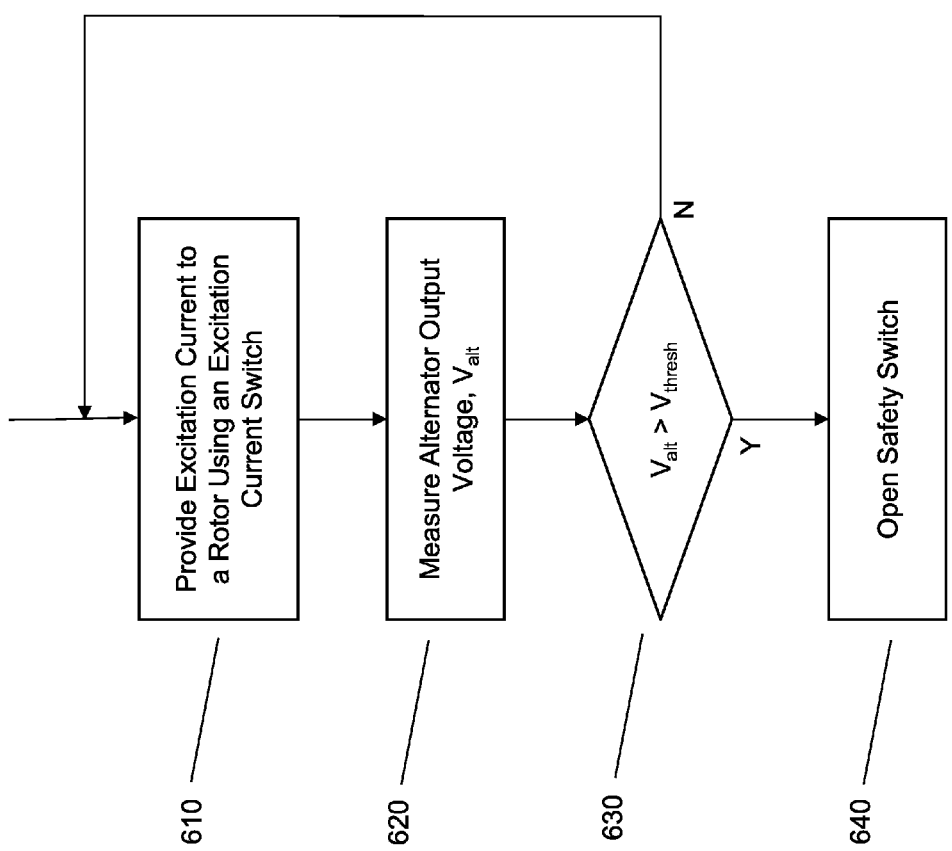
FIG. 6 illustrates a method for mitigating a fault condition of an alternator, by disconnecting the supply voltage from an excitation current switch that drives a rotor in an alternator.

FIG. 6 illustrates a method for preventing a prolonged period in which an alternator is providing excessive voltage at its output. This method may be implemented, e.g., in a fault protection circuit 300 as shown in FIG. 4, or in a combination of a fault protection circuit 300 and an ECU as shown in FIG. 3. The method begins at step 610 wherein an excitation current is provided to a rotor of an alternator. The excitation current is provided using an excitation current switch that controls the amount of current provided to the rotor. In a step 620, the alternator output voltage, $V_{alt}$, is measured. (This voltage may be, for example, the same as a battery voltage $V_{bat}$.) The voltage $V_{alt}$ is then compared, in step 630, against a threshold, $V_{thresh}$, to determine if the alternator output voltage is excessive. If the alternator output voltage $V_{alt}$ is greater than the threshold voltage $V_{thresh}$, then a safety switch is opened at step 640 thereby disconnecting the supply voltage to the excitation current switch. If the alternator output voltage $V_{alt}$ is not above the threshold voltage $V_{thresh}$, i.e., the voltage is in a safe range, normal operation continues at step 610.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A fault protection circuit for an alternator, comprising:
a first switch having a first terminal electrically connected to an intermediate supply node, a second terminal electrically connected to a rotor in the alternator, and a third terminal, wherein the first switch is configured to provide an excitation current to the rotor as a function of an excitation current control signal applied to the third terminal and a voltage at the intermediate supply node, so as to regulate an output voltage of the alternator;
an alternator controller circuit comprising an excitation current controller configured to generate the excitation current control signal;
a supervision circuit configured to detect a fault condition of the first switch and, responsive to this detection, generate a fault indication signal; and
a second switch electrically connected directly in series between the intermediate supply node and a supply voltage, the second switch configured to continuously disconnect the supply voltage from the intermediate supply node so long as the fault indication signal is active, and wherein the output voltage of the alternator provides the supply voltage.

2. The fault protection circuit of claim 1 wherein the fault indication signal is an overvoltage indication signal that indicates that the output voltage of the alternator has exceeded a predetermined limit.

3. The fault protection circuit of claim 1 wherein the fault indication signal indicates that a highly resistive short of 100 kohms or more exists between the first terminal and the second terminal of the first switch.

4. The fault protection circuit of claim 1, wherein the supervision circuit is disposed in a different semiconductor die than the alternator controller circuit.

5. The fault protection circuit of claim 1, wherein the supervision circuit and the second switch are disposed in the same semiconductor die.

6. The fault protection circuit of claim 1, wherein the fault indication signal is received by the alternator controller circuit from an electronic control unit (ECU).

7. The fault protection circuit of claim 1, further comprising:
a communication interface circuit configured to receive the fault indication signal from an electronic control unit (ECU) and to send the fault indication signal to the second switch, wherein the communication interface circuit is disposed on a different semiconductor die than the alternator controller circuit.

8. The fault protection circuit of claim 7, wherein the fault indication signal is received by the communication interface circuit over a serial bus.

9. The fault protection circuit of claim 8, wherein the serial bus is a Local Interconnect Network (LIN) bus.

10. The fault protection circuit of claim 8, wherein the serial bus is a Controller Area Network (CAN) bus.

11. The fault protection circuit of claim 7, wherein the fault indication signal is received by the communication interface circuit over a dedicated line separate from a shared serial bus over which the ECU communicates with the alternator controller circuit.

12. The fault protection circuit of claim 1, wherein the excitation current control signal is a pulse-width modulated (PWM) signal.

13. The fault protection circuit of claim 1, wherein the alternator output voltage is directly connected to the supply voltage at a common node.

14. The fault protection circuit of claim 1, wherein the alternator charges a battery and the supply voltage is provided by the battery.

15. The fault protection circuit of claim 1, wherein the first switch is a metal-oxide semiconductor field-effect transistor (MOSFET) and the third terminal of the first switch is a gate of the MOSFET.

16. The fault protection circuit of claim 15, wherein the first switch is an N-channel MOSFET and the second switch disconnects the supply voltage from a drain of the N-channel MOSFET.

17. The fault protection circuit of claim 15, wherein the first switch is a double-diffused MOSFET.

18. A brush holder for use in an alternator, the brush holder comprising:
  a housing retaining a brush configured to conduct an excitation current to a rotor in the alternator;
  a first switch retained by the housing, the first switch having a first terminal electrically connected to an intermediate supply node, a second terminal electrically connected to the brush, and a third terminal, wherein the first switch is configured to provide the excitation current to the rotor via the brush as a function of an excitation current control signal applied to the third terminal and a voltage at the intermediate supply node, so as to regulate an output voltage of the alternator;
  an alternator controller circuit retained by the housing, the alternator controller circuit comprising an excitation current controller configured to generate the excitation current control signal;
  a supervision circuit configured to detect a fault condition of the first switch and, responsive to this detection, generate a fault indication signal; and
  a second switch retained by the housing, the second switch electrically connected directly in series between the intermediate supply node and a supply voltage, the second switch configured to continuously disconnect the supply voltage from the intermediate supply node so long as the fault indication signal is active, and wherein the output voltage of the alternator provides the supply voltage.

19. The brush holder of claim 18, wherein the supervision circuit and the second switch are disposed in the same semiconductor die.

20. A method in an alternator for mitigating a fault condition of the alternator, the method comprising:
  providing an excitation current to a rotor of the alternator using a first switch having a first terminal electrically connected to an intermediate supply node, a second terminal electrically connected to the rotor, and a third terminal, wherein the excitation current provided to the rotor is a function of an excitation current control signal applied to the third terminal and a voltage at the intermediate supply node, so as to regulate an output voltage of the alternator, the excitation current control signal being generated by an alternator controller circuit that comprises an excitation current controller;
  detecting a fault condition of the first switch, via a supervision circuit, and generating a fault indication signal in response to said detecting and for as long as the fault condition persists; and
  responsive to the generated fault indication signal, continuously disconnecting a supply voltage from the intermediate supply node by opening a second switch electrically connected directly in series between the intermediate supply node and the supply voltage, and wherein the output voltage of the alternator provides the supply voltage.

* * * * *